(No Model.)  6 Sheets—Sheet 2.

C. C. HILL.
WIRE NAIL MACHINE.

No. 358,553.  Patented Mar. 1, 1887.

Witnesses:

Inventor:
Christian C. Hill.
By Munday, Evans & Adcock
his Attorneys.

(No Model.)   6 Sheets—Sheet 3.

C. C. HILL.
WIRE NAIL MACHINE.

No. 358,553.   Patented Mar. 1, 1887.

Witnesses:
Lew. E. Curtis
H. M. Munday

Inventor:
Christian C. Hill
By Munday, Evarts & Adcock
his Attorneys (No Model.) 6 Sheets—Sheet 5.

C. C. HILL.
WIRE NAIL MACHINE.

No. 358,553. Patented Mar. 1, 1887.

Witnesses:
Lew. E. Curtis.
H. W. Munday.

Inventor:
Christian C. Hill
By Munday, Evarts & Adcock
his Attorneys.

N. PETERS, Photo-Lithographer, Washington, D. C.

(No Model.) 6 Sheets—Sheet 6.

C. C. HILL.
WIRE NAIL MACHINE.

No. 358,553. Patented Mar. 1, 1887.

Witnesses:
Lew. C. Curtis.
H. W. Munday.

Inventor:
Christian C. Hill
By Munday, Evarts & Adcock
his Attorneys.

UNITED STATES PATENT OFFICE.

CHRISTIAN C. HILL, OF CHICAGO, ILLINOIS, ASSIGNOR OF ONE-THIRD TO HIMSELF, ONE-THIRD TO JOHN W. MUNDAY, EDWARD S. EVARTS, AND EDMUND ADCOCK, AND ONE-THIRD TO JOHN W. MUNDAY, TRUSTEE, ALL OF SAME PLACE.

WIRE-NAIL MACHINE.

SPECIFICATION forming part of Letters Patent No. 358,553, dated March 1, 1887.

Application filed May 11, 1886. Serial No. 201,822. (No model.)

*To all whom it may concern:*

Be it known that I, CHRISTIAN C. HILL, a citizen of the United States, residing at Chicago, in the county of Cook and State of Illinois, have invented a new and useful Improvement in Wire-Nail Machines, of which the following is a specification.

My invention relates to machines for making wire nails.

Wire-nail machines heretofore in use have generally been made with reciprocating dies, and the operative parts have ordinarily had a variety of intermittent or stop motions, so that the capacity of the machines has been comparatively limited, thus making the cost of manufacture very considerable, especially in the small sizes of nails or brads.

The object of my invention is to produce a wire-nail machine of a simple, durable, efficient, and cheap construction, the dies or operative parts of which have no intermittent, reciprocating, or stop motions, and which may therefore be run at great speed and have a correspondingly-great capacity, so that even the smallest sizes of nails may be manufactured at slight cost.

To this end my invention consists in one or more pairs of continuously-revolving clamping dies arranged parallel to the axes on which they revolve and registering together as they pass the line joining their centers of rotation, so as at this point to firmly clamp and hold the blank from which the nail is to be made during the heading and pointing operations.

It also consists in one or more pairs of revolving pointing-dies mounted at one end of the clamping-dies and concentric therewith, and preferably mounted upon the same rotary carrier or disk as the clamping-dies, so that the pointing will be effected simultaneously with the clamping of the nail and by the same movement. The pointing-dies may be formed integral with the clamping-dies; but it is preferable to make them of separate pieces of steel, because of their greater liability to wear, and consequent need for more frequent removal and replacement, and also for convenience of adjustment.

It also consists, in conjunction with the revolving clamping-dies, of a rotary heading tool or die revolving continuously like the clamping-dies, and with an approximately equal surface-speed, its axis being transverse to the axes of the clamping-dies and arranged and adapted to strike or act directly upon the projecting end of the nail-blank or upon an interposed swaging block or die at the instant said blank is firmly held or compressed between the clamping-dies.

It also consists, in conjunction with the revolving clamping-dies and the continuously-revolving rotary heading tool or hammer, of an interposed continuously-revolving swaging block or die. This interposed swaging-die is preferably carried upon one of the revolving clamping-dies, or its disk or carrier, and is driven upon the nail-head by the rotary heading-tool. Where a number of clamping-dies are mounted upon each rotary disk or carrier one of these swaging-blocks should be employed for each pair of dies. By the addition of these interposed head-swaging blocks I am enabled to give the head any desired configuration or size, and they are specially serviceable in overcoming the tendency of the rotary heading-tool, when acting directly upon the projecting end of the nail-blank, to incline the same, especially where considerable stock is to be put into the head.

It also consists, in conjunction with the continuously-revolving clamping-dies, of the wire-feed device—preferably a simple pair of revolving feed-rollers—for feeding the wire from which the nail-blanks are cut across the path of one of the revolving clamping-dies, or across the face or periphery of the disk or rotary carrier to which the die is secured.

It also consists, in conjunction with said clamping-dies and wire-feed, of a rotary cutter or knife revolving continuously like the clamping-dies and arranged about tangentially to the path of said dies, and at the same or about the same surface-speed, said knife operating in conjunction with an opposing stationary knife.

It also consists, in conjunction with said wire-feed device and said revolving clamping-dies, of a fixed stop for the end of the wire to abut against as it is fed forward across the path of said die, so as to insure the nail-blanks all being exactly the desired length.

It also consists, in conjunction with this stop, of a feed device operated or geared to feed the wire faster than required and adapted to slip after the end of the wire strikes against this measure or stop. By this means just the required length of wire is certain to be fed for each blank, and no more, as the extent of feed in no way depends upon the timing or accurate speeding of the feed device or of its firmness of grip upon the wire, the only condition required, within reasonable limits, being that the feed be fast enough.

It also consists, in conjunction with the revolving clamping-dies, of a shoe or curved guard concentric with the path of one of said dies and extending from the feed-point to near the point where the two dies come together, for the purpose of holding the nail-blank after it is severed from the wire in or upon said die, and thus causing said blank to be carried by said die between such die and its opposing die.

It also consists in providing this shoe or guard with a spring or yielding pressure device for the purpose of better holding the nail-blank in or upon the die.

It also consists, in conjunction with the revolving die and said shoe or guard, of a drag-spring or yielding straightening device projecting across the path of the nail-blank as it is carried in or upon said die, for the purpose of pulling, arranging, or straightening the blank in the die in case it should not lie straight or properly therein as the die passes.

It also consists, in conjunction with said shoe or curved guard and the revolving clamping-die which carries the blank, in providing the opposite clamping-die with a peripheral groove or recess for the extreme end of this shoe or curved guard to extend into, so that the shoe may extend down between the opposing dies as they come together in their circular paths sufficiently to hold the blank securely in place until it is grasped between the opposing dies.

It also consists in so grinding or shaping the opposing clamping and pointing dies, especially the latter, that their peripheral faces or cheeks, which roll together, are slightly higher (that is, farther from the center of rotation) than the cutting-edges of said dies, so that while said opposing cutting-edges may come so closely together as to completely sever the wire and point the nail, they nevertheless cannot quite touch. By this means the cutting-edges of the opposing dies as they revolve together are prevented from grinding or injuring each other, and the durability of the dies may be increased.

My invention also consists in the novel devices and novel combinations of devices herein shown and described, and more particularly pointed out in the claims.

In the accompanying drawings I have shown a machine embodying my invention, and said machine constitutes what I believe to be the best way now known to me of practicing the same, not only in point of speed and efficiency of operation, but also in points of durability, simplicity, and cheapness of construction, ease of adjustment, &c.; and while this best and most perfect form of my invention known to me involves all or nearly all the several features of the invention hereinbefore in part enumerated, and hereinafter more particularly pointed out in the different claims, it should, however, be observed that many of the principal features of my invention may separately be employed or embodied in machines without the others.

In said drawings like letters of reference indicate like parts.

Fig. 6 is an enlarged detail sectional view of one of the rotary die wheels or carriers, showing a method of mounting or securing the dies. Fig. 7 is a radial cross-section on line 7 7 of Fig. 6. Fig. 8 is a plan or face view of one of the clamping and pointing dies. Fig. 9 is a section on line 9 of Fig. 8. Fig. 10 is a central vertical section showing the feed-wheels. Fig. 11 is a section on line 11 11 of Fig. 10. Fig. 12 is a cross-section of the heading-die shaft, showing said die and the means of securing and adjusting it. Fig. 13 is a detail view of one of the rotary die-shafts, showing the keys for securing and adjusting the driving-gear thereon. Fig. 14 is an enlarged detail view showing the feed-wheels and rotary cutter. Fig. 15 is an enlarged detail view showing the rotary cutter and curved guard or shoe. Fig. 20 is a detail end view of the opposing revolving clamping-dies, showing the nail-blank clamped therein. Fig. 21 is a detail view of the shoe or curved guard. Fig. 22 is a detail perspective view of the cutter or knife. Fig. 23 is a perspective view showing the drag-spring, the stop or feed gage, and the curved guard or shoe. Fig. 24 is a view of the nail or product made by the machine. Fig. 28 is a section on line 28 28 of Fig. 26, and Figs. 29 and 30 are detail views illustrating the operation of the direct-acting rotary header.

In said drawings, A represents the frame of the machine, which should be of a strong and unyielding construction.

B and C are a pair of opposing rotary die-carriers, preferably solid disks or wheels, revolving together. These disks should be made of steel, and their shafts B' and C' are preferably cast integral with them to prevent any possibility of the die-carrier disks moving on their shafts and thus getting out of adjustment. For convenience of mounting and adjusting the dies on the peripheries of these disks or die-carriers, I provide each of said disks with an annular groove, $b\ c$, thus forming an annular peripheral rim, $b'\ c'$, and in radial slots or recesses $b^2\ c^2$, cut in these rims, the clamping-dies D D and the pointing-dies E E are mounted or secured.

Figures 14, 15, 20, 21, 22, 23, 24, 29, 30:
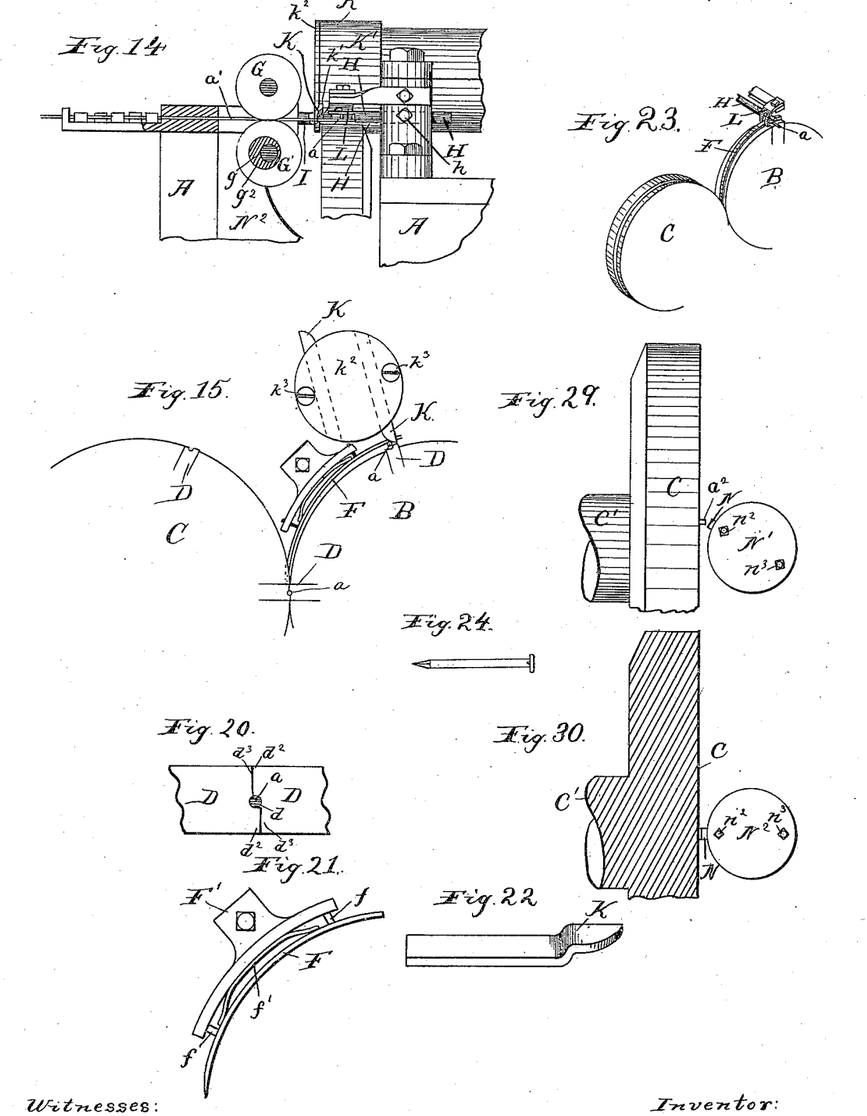
Figure 25:
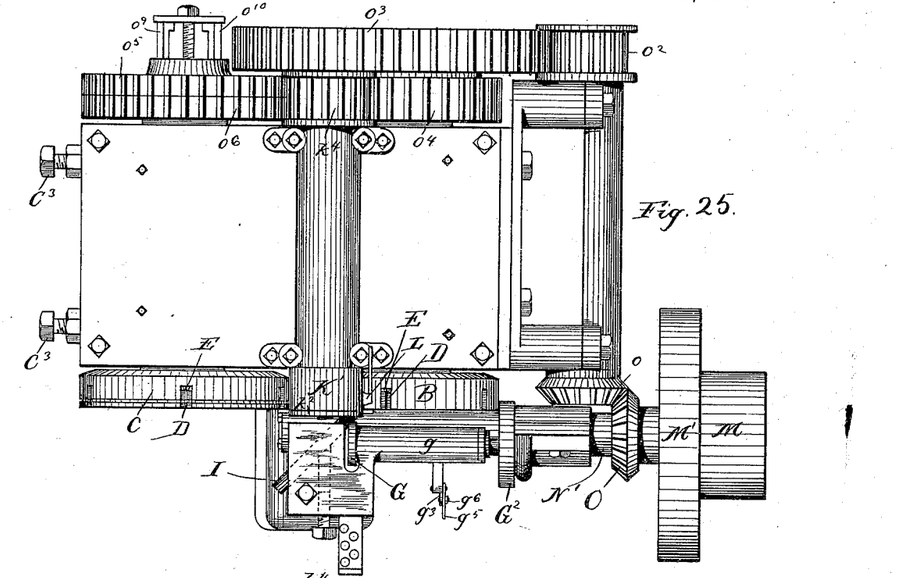
Figs. 25, 26, and 27 are plan, side, and end views showing a modification wherein the rotary heading-tool acts directly upon the projecting end of the nail, the interposed swaging blocks or dies being omitted.
Figure 26:
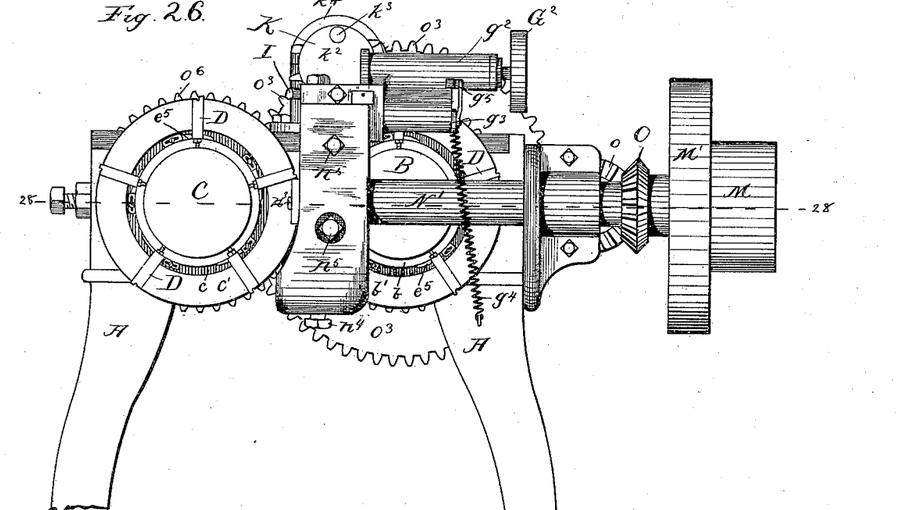
Figure 27:
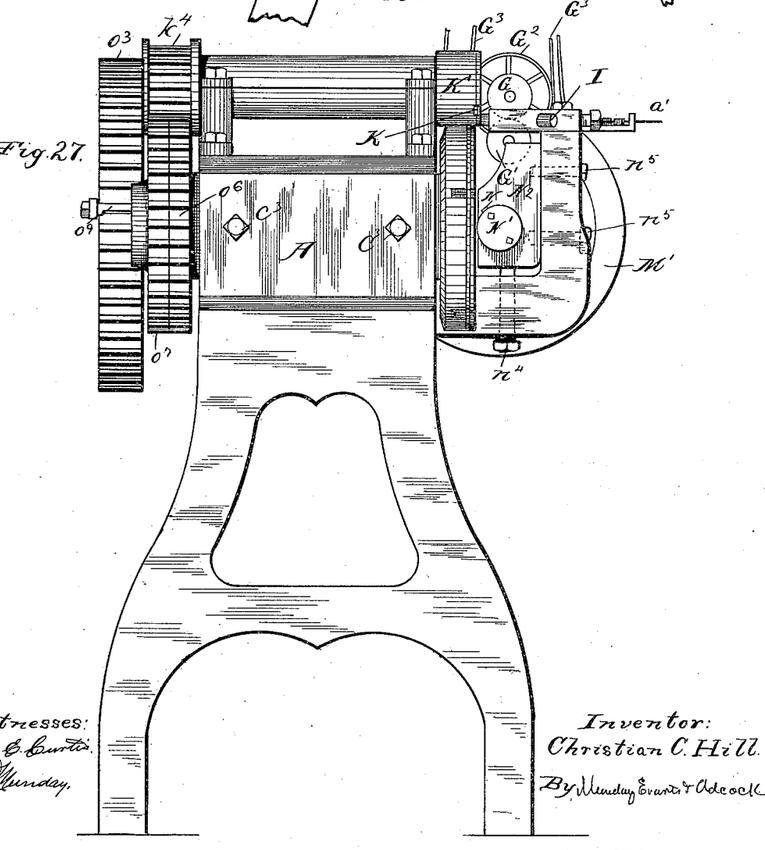

Any desired number of dies may be mounted on each wheel or disk. In the machine shown in the drawings five pairs of dies are employed. The clamping-dies are all alike, excepting that those on the disk B complement and counter the opposing ones on the disk C. Each of these dies consist of or are provided with a half-round groove or other shaped receptacle, $d$, conforming to the shape of the blank to be clamped between them. Each of the opposing dies also preferably has a projecting ledge, $d'$, constituting one side or wall of the groove $d$. The ledge $d'$ has a peripheral or curved face, $d^2$, which is or should be concentric or about concentric with the periphery of the disks B C. The face $d^3$ of the die D on the other or opposite side of the groove $d$ is ground on a curve of the same or about the same radius as the disks B C, and concentric or about concentric thereto. The projecting ledges $d'$ on the opposing dies D D of the disks B C of course counter each other, as indicated in Figs. 15 and 20. The projecting ledges $d'$ of the dies, which are mounted on disk B, serve to carry or force the nail-blank $a$, after it is severed from the wire $a'$, around under the curved shoe or guard F, until it meets and is clamped by the opposing die D on the disk C.

Figures 6, 7, 8, 9, 10, 11, 12, 13, 28:
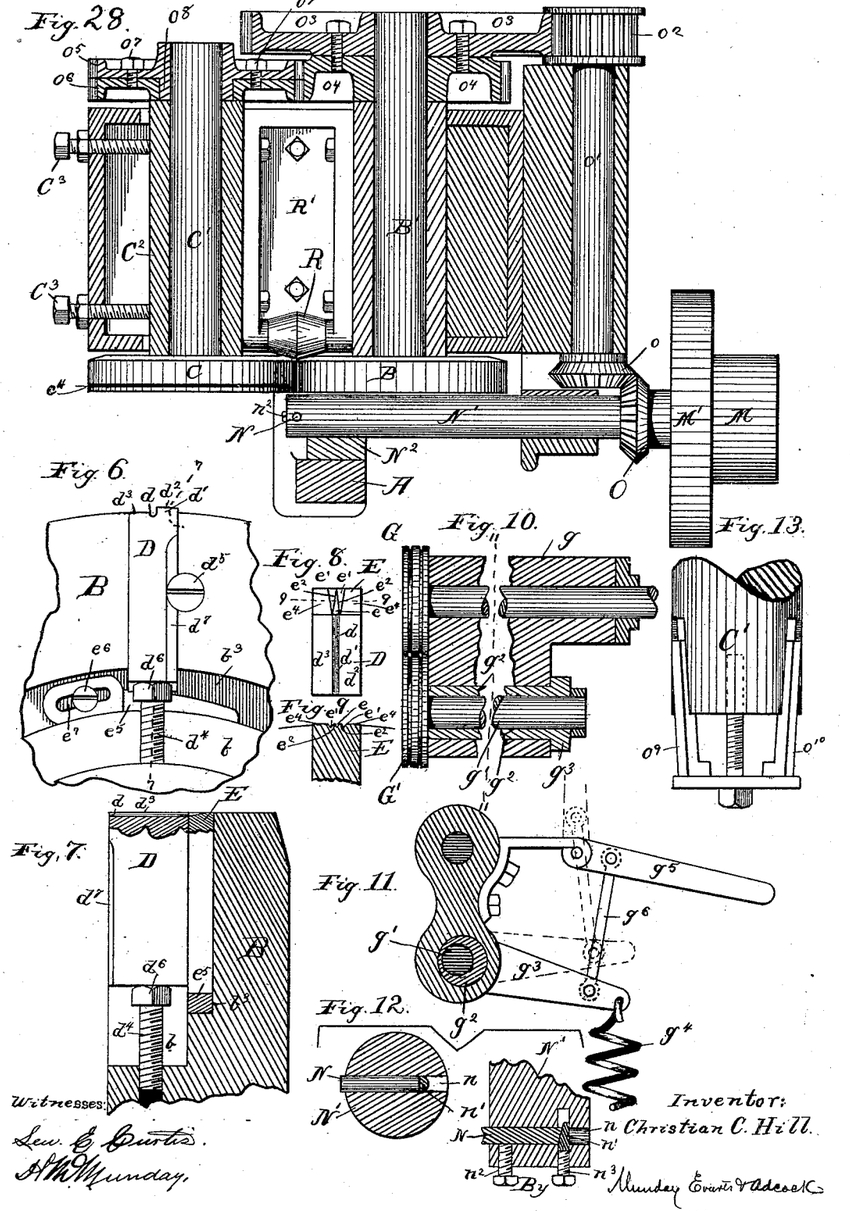

The dies D D are secured in place in their slots or seats in the disks or carriers B C by means of threaded bolts or screws $d^4$ and $d^5$. The die D consists simply of a rectangular block of steel, and its end rests upon the threaded bolt or screw $d^4$, which has a polygonal or angular head, $d^6$, for the reception of a wrench to adjust the position of the die radially. The head of the screw or bolt $d^5$ fits against the beveled edge or corner $d^7$ of the die D, and serves to secure the die D transversely. The opposing pointing-dies E E are also of a similar construction to each other. Each preferably consists of a half-conical or half-pyramidal groove, $e$, continuing the half-cylindrical groove of the clamping-dies, and two similar oppositely-turned grooves, $e'\ e'$, one on each side of the groove $e$, thus forming the V-shaped cutting-edges $e^2\ e^2$ of the pointing-die, as shown in Figs. 8 and 9. The peripheral faces $e^4\ e^4$ of the dies E E, on each side of the V-shaped cutting-edges $e^2\ e^2$, are slightly higher or ground on a curve having a slightly-larger radius than the curve described by said cutting-edges, so that the opposing dies E E, abutting against their peripheral faces $e^4\ e^4$, will prevent their cutting-edges $e^2\ e^2$ from touching or striking against each other and thus becoming worn or injured. These abutting faces $e^4\ e^4$ are, however, only very slightly higher than the cutting-edges $e^2\ e^2$, so that said cutting-edges will nevertheless come sufficiently close together to completely sever the wire and point the nail, or leave such an extremely thin fin that it will readily tumble off and produce a smooth clean cut point.

The pointing-dies E E are secured in the same radial slots, $b^2\ c^2$, in the disks B C as the clamping-dies D D, and the same screw, $d^5$, serves to hold the pointing-die in place transversely, the pointing-die being, in fact, clamped between the clamping-die D and the back wall of the slot $b^2$ or $c^2$. The inner end of the pointing-die E rests upon and the die is adjusted radially by a wedge, $e^5$, that fits and slides in a groove or recess, $b^3\ c^3$, in the disks B C. This wedge is held in place by a clamp-screw, $e^6$, which passes through a slot, $e^7$, in said wedge. As the dies E E roll together in peripheral paths, their cutting-edges have somewhat of a shearing action, and hence operate much more easily, both in respect to the power required and wear upon the dies themselves, than where the dies are made to approach each other on a direct line, as is the case with reciprocating dies; and in my revolving dies one of the cutting-edges $e^2\ e^2$ operates, in part at least, slightly in advance of the other, and, as the work is done at the very instant the opposing dies approach their common diametrical line, they have a kind of knee-joint or toggle-lever action, so that the machine acts very powerfully and easily exerts a very great pressure. The clamping-dies, of course, have this same action, and hence are easily made to clamp the nail-blank with great pressure at the instant the heading-die operates.

The wire $a'$ is fed across the circular path of the dies D E on the wheel or disk B, or across the peripheral face of said disk, by a pair of continuously-revolving grooved feed wheels or rollers, G G'. The upper feed-wheel, G, or its shaft, is journaled on a frame or arm, $g$, secured to the frame of the machine, and the lower roller, G', or its shaft $g'$, is journaled on an eccentric sleeve, $g^2$, which turns in suitable bearings in the arm or bracket $g$. This eccentric sleeve $g^2$ is provided with a projecting arm or lever, $g^3$, to which a spring or weight, $g^4$, is applied for the purpose of pressing the feed-rollers G G' together with sufficient force to grip and feed the wire. A lever, $g^5$, connected to the arm $g^3$ by a link, $g^6$, serves to move the lower feed-roller out of contact with its companion, and thus stop the feed when desired; and when the lever $g^5$ is raised into the position indicated in dotted lines in Fig. 11, it will so remain, the centers being passed. The wire $a'$ is continuously fed forward by these feed-rollers until the end of the same strikes and abuts against a fixed stop or gage, H, which projects across the periphery of the disk B. This stop or gage is secured to the frame of the machine or a suitable bracket thereon, and is adjustably fixed in place by a set-screw, $h$, or other suitable device.

The curved guard or shoe F is provided with guide pins or studs $ff$, which fit in suitable holes in a bracket, F', secured to the stationary frame of the machine, and which overhangs the disk B. A spring, $f'$, serves to press this curved guard or shoe against the periphery of the disk B, or against the nail-blank $a$ carried thereon. The heads of the guide-pins $ff$ serve to limit the space between this shoe and the periphery of the disk B. The shoe F should be comparatively narrow in relation to the length of the nail-blank, and the disk or carrier C should be provided with a peripheral channel or groove, $c^4$, for the lower end of this shoe to fit in, so that the shoe may extend down far enough to hold the nail-blank in place until it is clamped between the opposing dies; and for the same reason and purpose the clamping-dies B on the disk C are furnished with a similar groove or notch.

K is a rotary cutter or knife mounted on the enlarged end or head K' of the cutter-shaft K². This head K' is preferably furnished with two knives, K, though a greater or less number may be employed, as desired. The axis of the rotary cutter is or should be parallel to the axes of the revolving clamping-dies or their carriers B C, so that the cutters K will revolve in a plane at right angles to the wire $a'$.

I is an opposing stationary knife mounted on the frame of the machine, and across the edge of which the wire $a'$ is fed. The circular path of the rotary knives K K is or should be about tangential to the path of the clamping-die D on the disk B, and these rotary cutters have or should have the same or about the same surface-speed as said dies. In this way or by this means, the rotary cutters, as they strike the wire and sever and carry the nail-blank past the edge of the stationary knife I, will not tend to disturb the transverse position of the blank on the periphery of the disk B, or rather its longitudinal position in the clamping-die thereon. The knives K K fit in suitable slots or grooves cut in the end face of the head K', or in the clamping-disk $k^2$, by which the knives are clamped or held in place. Screws or threaded bolts $k^3$ serve to firmly clamp the plate or disk $k^2$ against the knives. The knives are readily adjusted by simply loosening the screws $k^3$ and driving on the ends of the knives with a punch and hammer. The cutting-edge of the knives should preferably be curved about as shown in Fig. 15.

L represents a drag-spring or yielding device for insuring the proper positioning of the nail-blank against the projecting ledge $d^2$ of the die D after it is severed from the wire. This nail-blank-arranging device L preferably consists of a forked or slotted spring, as shown in Fig. 23, the lower forked ends of which fit astride the shoe or curved guide F. As the nail-blank is carried forward under the shoe by the projecting ledge $d^2$ of the die, if for any cause the blank should not happen to lie perfectly straight in the die, this forked spring L will draw the blank snugly into the die as the blank and die pass under the spring. The lower or operating end of this spring should be located just in front of the place where the wire is fed across the periphery of the disk B.

Figure 1:
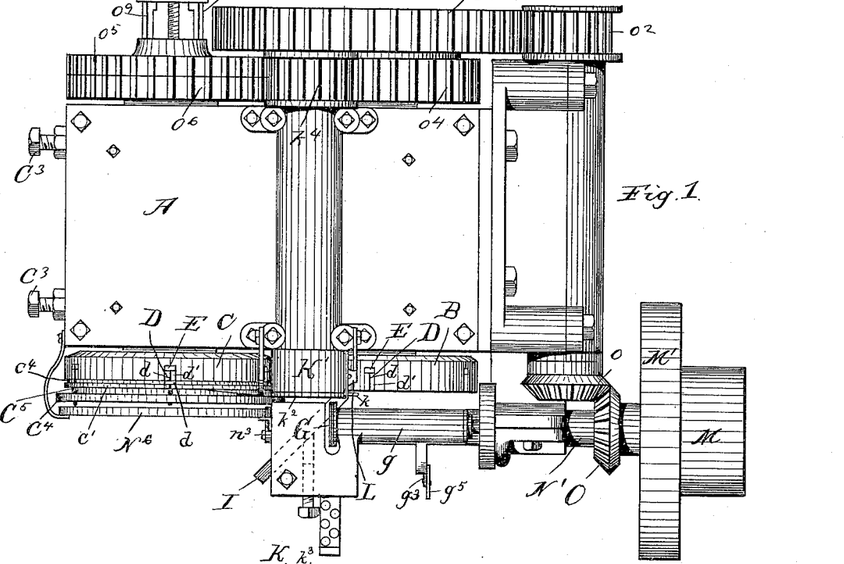
Figure 1 is a plan view of the machine.
Figure 2:
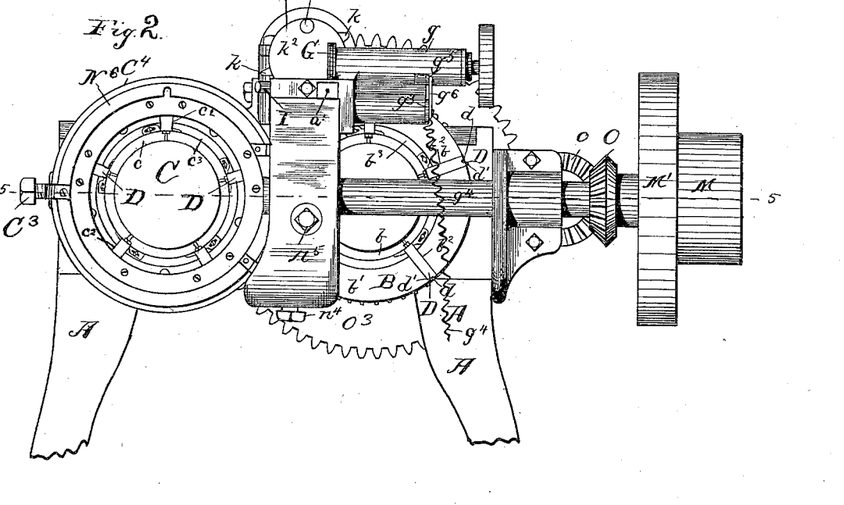
Fig. 2 is a front side view.
Figure 3:
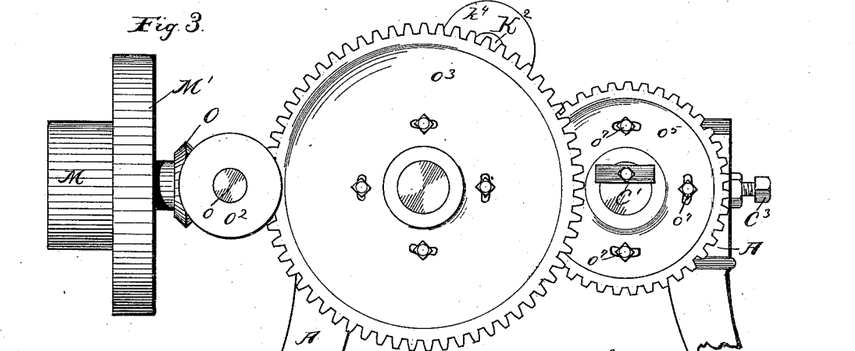
Fig. 3 is a rear side view.
Figures 4, 5, 16, 17, 18, 19:
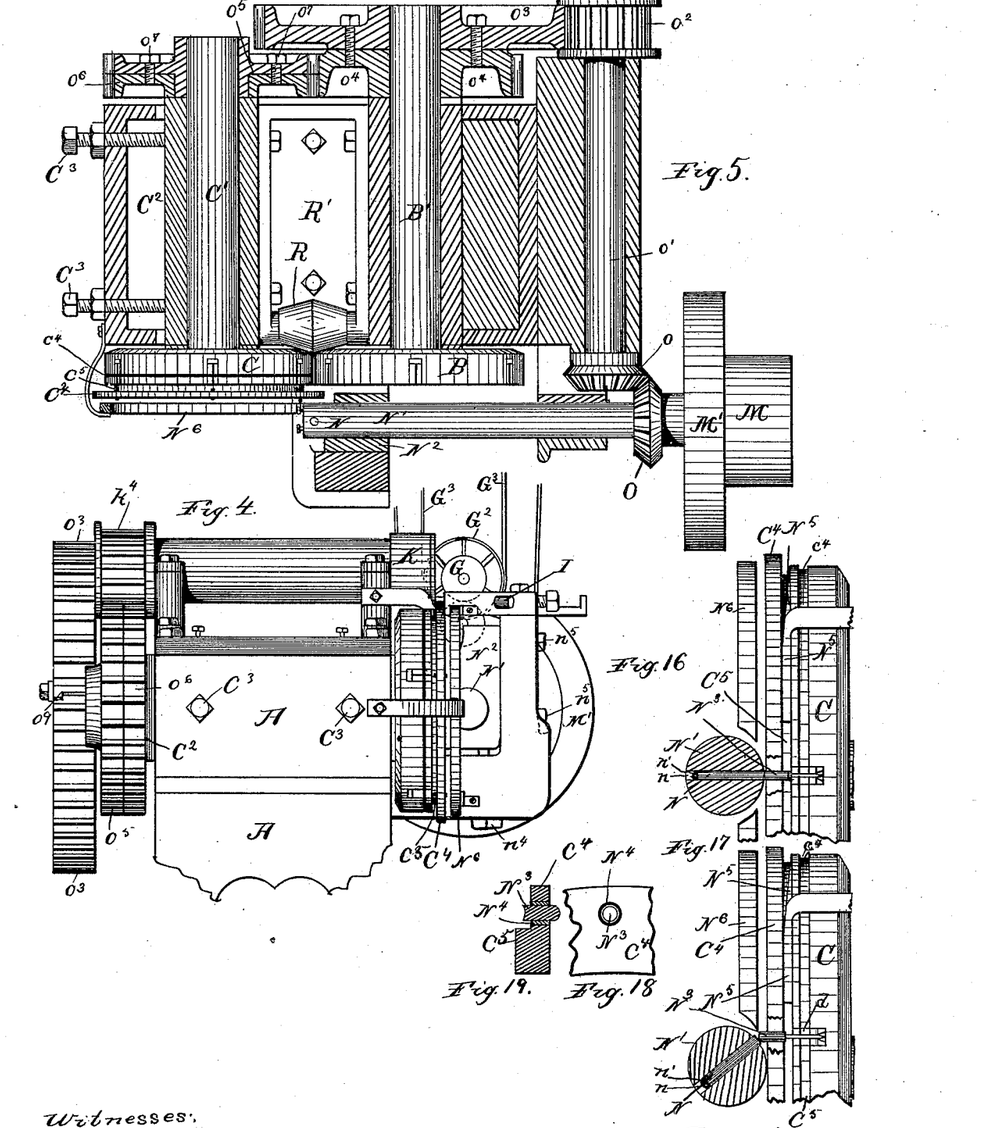
Fig. 4 is an end view.
Fig. 5 is a longitudinal section on line 5 5 of Fig. 2.
Figs. 16 and 17 are detail views illustrating the operation of the heading tool or die.
Figs. 18 and 19 are detail views of the interposed swaging block or die and its carrier-ring.

N is the rotary heading die or tool. It is mounted in a suitable slot or hole, $n$, in the shaft N', and consists, preferably, of a round block of steel. It is secured in its shaft by a wedge, $n'$, and a pair of set-screws, $n^2\ n^3$, one of which, $n^2$, serves to tighten the die in place, and the other, $n^3$, to adjust it radially in or out from the center of its shaft by moving the interposed wedge $n'$ at the end of the tool. The heading-die shaft N' is made adjustable in two directions—that is to say, its box or bearing N² is adjustable vertically by suitable screws, $n^4$, and to or from the end face of the die-wheels B C by screws $n^5$, or other suitable means. The purpose of these three adjustments is not only to regulate the shape and degree of flatness of the head formed upon the nail by the die, but also to properly center the head on the nail or upon the interposed swaging block or die N³. The swaging blocks or dies N³, one for each pair of dies D, are mounted upon a suitable ring or projecting flange, C⁴, secured to the disk C in such position that the outer rim of said ring will project over the outstanding end of the nail-blank. This ring C⁴ is removably bolted or screwed to the disk C, and is provided with an annular shoulder or offset, C⁵, which fits against the face of the disk C, so that an annular space may be left between the rim of the ring and the face of the disk or the dies, equal to or greater than the length of the projecting end of the nail-blank. The swaging blocks or dies N³ are mounted in suitable holes furnished with steel bushings N⁴. These holes are so arranged that the swaging-blocks register centrally with the dies D D. The outer ends of these blocks or dies N³, against which the heading-tool end strikes, should be slightly rounded, as indicated in Fig. 19, and the inner end may be cupped or given any desired configuration to form the style of head desired. After the head has been formed upon the nail each block or die N³ is returned to position by a stationary cam, N⁵, secured to the frame of the machine in the circular path of said block or die, and which forces it out ready to strike the nail-head.

A stationary curved guard, N⁶, serves to hold the swaging-blocks in their places while the machine is in motion. As the swaging blocks or dies N³ are carried on the disk C, and consequently have the same path and rotary movement as the dies D D and nail-blank clamped between them, and as the endwise movement of the blocks or dies N³ is directly in line with the length of the nail, they strike a true blow, and will form a perfect head upon the nail of any desired shape.

The heading-tool N should be so timed and located in relation to the clamping-dies D that it will not strike the interposed die or block N³ until the nail-blank has been firmly seized or clamped between the dies D D; and ordinarily I so adjust the heading-tool shaft N' that its center is somewhat below the diametrical line joining the centers of the disks B C, so that the interposed die-block will not be struck until the dies D D and the nail therein almost arrive at this diametrical line.

In that modification of the machine wherein the interposed swaging blocks or dies N³ are not employed, as illustrated in Figs. 25 to 30, inclusive, and wherein the rotary heading-tool acts directly upon the projecting end of the nail-blank, the face of the die of course approaches the projecting end $a^2$ of the nail-blank in a curved path, and it is consequently somewhat inclined when it first strikes said projecting end, and would thus have a tendency to slightly wipe or incline the head upward. This tendency is, however, very easily counteracted by slightly increasing the surface-speed of the heading-die, so that the speed of the die shall be slightly in excess of that of the nail-blank.

The surface-speed of the face of the heading-die may be regulated by simply adjusting the die N radially in or out, and thus increasing or diminishing the radius of the circle in which it travels. Any radial adjustment of the die would, however, affect the shape or degree of flatness of the head of the nail unless such radial adjustment was compensated for by a corresponding bodily adjustment of the header-shaft to or from the disks B C. By means of the three adjustments before referred to, however, the head of the nail may be made of any desired form and still be formed centrally upon the nail. If desired, also, the heads may be uniformly made more or less to one side of the nail by a simple adjustment of the header-die and its shaft. Where the heading-die acts directly it tends to prevent the die from slipping on the end of the nail-blank to serrate or roughen the face of the die.

The header-die shaft N' should in any construction be sufficiently long to give room for a firm and secure bearing upon the frame of the machine. It is furnished with a band-wheel, M, and a fly-wheel, M'. A bevel-gear, O, upon this shaft transmits, through the bevel-gear $o$ on the counter-shaft $o'$ and a spur-gear, $o^2$, thereon, motion to the shaft B' of the die-disk B by means of a spur-gear, $o^3$, which meshes with the spur-gear $o^2$ on the counter-shaft $o'$. Motion is communicated to the opposite shaft, C', of the die-disk C by means of a spur-gear, $o^4$, on the shaft B', which meshes with a spur-gear, $o^5$, on the shaft C'. This spur-gear $o^5$ is or should be provided with a split part, $o^6$, secured to the part $o^5$ by bolts $o^7$, which pass through slots in the split-gear parts $o^5$ $o^6$, so that by slightly turning or adjusting the part $o^6$ on the part $o^5$ all wear between the teeth of the gears $o^4$ and $o^5$ $o^6$ is taken up. This is a matter of great convenience in keeping the dies on the disks B C in proper register with each other. The split gear $o^6$ fits on the hub $o^8$ of the gear $o^5$. The hub of this gear $o^5$ is secured on the shaft C' by adjustable keys $o^9$ $o^{10}$, which fit in oblique inclined grooves in the shaft C' and corresponding straight grooves in the hub of the gear, so that by driving one wedge or the other the gear may be turned or adjusted in one direction or the other on the shaft for the purpose of bringing the dies on the disks B C in proper register with each other. The shaft B' of the disk B is mounted in fixed bearings on the frame of the machine; but the box or bearing C² of the shaft C' is made adjustable horizontally by means of threaded bolts C³ C³, for the purpose of adjusting the disk C to or from the disk B, and thus regulating the degree of pressure between said disks and the opposing dies thereon.

The shaft of the upper feed wheel or roller, G, is provided with a driving-pulley or band wheel, G², by which the feed-wheels are driven. The lower feed-wheel is or may be driven in the ordinary manner by a gear on its shaft, meshing with a gear on the shaft of the companion wheel. The band-wheel G² may preferably take its motion independently from the counter-shaft or source of power from which the band-wheel M is driven. The size of the pulley G² is such in relation to the size of the feed-wheels, the length of the nail-blank, and the speed of the disks B C and number of dies thereon that the wire will be fed somewhat faster than required, so that the end of the wire will be sure to strike against the stop or gage H before the rotary knife severs the nail-blank from the wire. But little power is required to drive the feed-wheels G G', and the belt G³, which operates the pulley G², should fit loose enough to slip readily upon the wheel the moment the forward feed of the wire is arrested by its end striking against the stop H; or the feed-wheels G G' may be adapted to slip upon the wire when the further feed of the same is arrested by the stop H. By this means no complicated feeding mechanism is required, nor accurate timing or speeding, in order to insure the requisite length of feed for each nail-blank, and all the nail-blanks will be cut of absolutely the same length. The rotary knife-shaft is driven by a gear, $k^4$, thereon, which meshes with the gear $o^4$ on the shaft B'.

In order to oppose the thrust of the heading operation, I provide a double-cone bearing-roller, R, applied to the back of the disks, inclining the surface of the disks and roll so that they will correspond in surface-speed. This avoids the strain and racking to which the disks might otherwise be subject, and affords a bearing that in nowise interferes with the free and rapid movement of the disks. To compensate wear, and also to furnish adjustment, the double-cone roll may be journaled in a frame, R', adjustable on the main frame of the machine by slotted bolt-holes or otherwise.

In case the rotary heading-tool N is employed in such manner as to come in direct contact with the head of the nail-blank without the interposed swage or block N³, the former may be preferably roughened or serrated to prevent it from slipping on the blank, more especially if a long portion of stock is to be flattened into a head.

I claim—

1. In a wire-nail machine, a pair of revolving opposing nail-blank-clamping dies, with their operative faces lying lengthwise with their axes of revolution, substantially as specified.

2. In a wire-nail machine, a pair of revolving opposing nail-blank clamping dies, with their operative faces lying lengthwise with their axes of revolution, and a pair of revolving pointing-dies coincident with said clamping-dies, substantially as described.

3. The combination of a pair of revolving clamping-dies with a transversely-revolving heading-tool, substantially as specified.

4. The combination, with a pair of revolving clamping-dies, of a pair of coincident revolving pointing-dies and a revolving heading-tool, substantially as specified.

5. The combination, with a pair of revolving clamping-dies, of a pair of coincident revolving pointing-dies, a revolving heading-tool, and a wire-feed device, substantially as specified.

6. The combination, with a pair of revolving clamping-dies, of a pair of coincident revolving pointing-dies, a revolving heading-tool, a wire-feed device, and a rotary nail-blank cutter, substantially as specified.

7. The combination, with a pair of revolving clamping-dies, of a pair of coincident revolving pointing-dies, a revolving heading-tool, a wire-feed device, and a stop or gage for the end of the wire, substantially as specified.

8. The combination, with a pair of revolving clamping-dies, of a pair of coincident revolving pointing-dies, a revolving heading-tool, a wire-feed device, a stop or gage for the end of the wire, and a rotary cutter, substantially as specified.

9. The combination, with a pair of revolving clamping-dies, of a pair of coincident revolving pointing-dies, a revolving heading-tool, a wire-feed device, a stop or gage for the end of the wire, a rotary cutter, and a curved guard concentric with the path of one of said clamping-dies for the severed nail-blank, substantially as specified.

10. The combination, with a pair of revolving clamping-dies, of a pair of coincident revolving pointing-dies, a revolving heading-tool, and a rotary swaging die or block interposed between said clamping-dies, and said rotary heading-tool, substantially as specified.

11. The combination of a pair of revolving clamping-dies, with a transversely-revolving heading-tool, and a revolving swaging die or block interposed between said clamping-dies and said rotary heading-tool, substantially as specified.

12. The combination, with a pair of rotary die-carriers, of a series of opposing clamping-dies mounted upon each of said carriers and with their operative faces lying lengthwise of the axes of revolution, substantially as specified.

13. The combination, with a pair of rotary die-carriers, of a series of opposing clamping-dies mounted upon each of said carriers and with their operative faces lying lengthwise of the axes of revolution, and a series of coincident pointing-dies, substantially as specified.

14. The combination, with a pair of rotary die-carriers, of a series of opposing clamping-dies mounted upon each of said carriers and with their operative faces lying lengthwise of the axes of revolution, and a transversely-revolving rotary heading-tool, substantially as specified.

15. The combination, with a pair of rotary die-carriers, of a series of opposing clamping-dies mounted upon each of said carriers and with their operative faces lying lengthwise of the axes of revolution, a series of coincident pointing-dies, and a transversely-revolving rotary heading-tool, substantially as specified.

16. The combination, with a pair of rotary die-carriers, of a series of opposing clamping-dies mounted upon each of said carriers and with their operative faces lying lengthwise of the axes of revolution, a series of coincident pointing-dies, and a transversely-revolving rotary heading-tool and a wire-feed device, substantially as specified.

17. The combination, with a pair of rotary die-carriers, of a series of opposing clamping-dies mounted upon each of said carriers and with their operative faces lying lengthwise of the axes of revolution, a series of coincident pointing-dies, and a transversely-revolving rotary heading-tool, a wire-feed device, and a rotary cutter, substantially as specified.

18. The combination, with a pair of rotary die-carriers, of a series of opposing clamping-dies mounted upon each of said carriers and with their operative faces lying lengthwise of the axes of revolution, a series of coincident pointing-dies, and a transversely-revolving rotary heading-tool, a wire-feed device, and a stop or gage for the end of the wire, substantially as specified.

19. The combination, with a pair of rotary die-carriers, of a series of opposing clamping-dies mounted upon each of said carriers and with their operative faces lying lengthwise of the axes of revolution, a series of coincident pointing-dies, and a transversely-revolving rotary heading-tool, a wire-feed device, and a stop or gage for the end of the wire and a rotary cutter, substantially as specified.

20. The combination, with a pair of rotary die-carriers, of a series of opposing clamping-dies mounted upon each of said carriers and with their operative faces lying lengthwise of the axes of revolution, a series of coincident pointing-dies, and a transversely-revolving rotary heading-tool, a wire-feed device and a stop or gage for the end of the wire, a rotary cutter, and a curved guard concentric with the path of said revolving clamping-dies, substantially as specified.

21. The combination, with a pair of rotary die-carriers, of a series of opposing clamping-dies mounted upon each of said carriers and with their operative faces lying lengthwise of the axes of revolution, a transversely-revolving heading-tool, and a series of rotary swaging dies or blocks mounted upon one of said rotary carriers and interposed between said clamping-dies and said rotary heading-tool, substantially as specified.

22. The combination, with a pair of rotary die-carriers, of a series of opposing clamping-dies mounted upon each of said carriers and with their operative faces lying lengthwise of the axes of revolution, a series of coincident pointing-dies, a transversely-revolving heading-tool, and a series of rotary swaging dies or blocks mounted upon one of said rotary carriers and interposed between said clamping-dies and said rotary heading-tool, substantially as specified.

23. The combination, with a pair of rotary die-carriers, of a series of opposing clamping-dies mounted upon each of said carriers and with their operative faces lying lengthwise of the axes of revolution, a series of coincident pointing-dies, a transversely-revolving heading-tool, and a series of rotary swaging dies or blocks mounted upon one of said rotary carriers and interposed between said clamping-dies and said rotary heading-tool, and a wire-feed device, substantially as specified.

24. The combination, with a pair of rotary die-carriers, of a series of opposing clamping-dies mounted upon each of said carriers and with their operative faces lying lengthwise of the axes of revolution, a series of coincident pointing-dies, a transversely-revolving heading-tool, a series of rotary swaging dies or blocks mounted upon one of said rotary carriers and interposed between said clamping-dies and said rotary heading tool, and a wire-feed device and a rotary cutter, substantially as specified.

25. The combination, with a pair of rotary die-carriers, of a series of opposing clamping-dies mounted upon each of said carriers and with their operative faces lying lengthwise of the axes of revolution, a series of coincident pointing-dies, a transversely-revolving heading-tool, a series of rotary swaging dies or blocks mounted upon one of said rotary carriers and interposed between said clamping-dies and said rotary heading-tool, a wire-feed device, and a stop or gage for the end of the wire, substantially as specified.

26. The combination, with a pair of rotary die-carriers, of a series of opposing clamping-dies mounted upon each of said carriers and with their operative faces lying lengthwise of the axes of revolution, a series of coincident pointing-dies, a transversely-revolving heading-tool, a series of rotary swaging dies or blocks mounted upon one of said rotary carriers and interposed between said clamping-dies and said rotary heading-tool, a wire-feed device, a stop or gage for the end of the wire, and a rotary cutter, substantially as specified.

27. The combination, with a pair of rotary die-carriers, of a series of opposing clamping-dies mounted upon each of said carriers and with their operative faces lying lengthwise of the axes of revolution, a series of coincident pointing-dies, a transversely-revolving heading-tool, a series of rotary swaging dies or blocks mounted upon one of said rotary carriers and interposed between said clamping-dies and said rotary heading-tool, a wire-feed device, a stop or gage for the end of the wire, a rotary cutter, and a curved guard concentric with one of said rotary carriers, substantially as specified.

28. A pair of revolving nail-blank-clamping dies, D D, each furnished with a projecting ledge, $d^2$, and countering with each other, substantially as specified.

29. The combination of a pair of rotary disks or die-carriers, B C, with a series of clamping-dies, D D, mounted thereon, provided with projecting ledges $d^2$, substantially as specified.

30. The combination, with a pair of rotary disks or die-carriers, B C, each provided with a series of clamping-dies, of projecting ledges on the disk B, for carrying the blank forward, substantially as specified.

31. The combination, with a pair of rotary disks or die-carriers, B C, each provided with a series of clamping dies, of projecting ledges on the disk B, for carrying the blank forward, and a blank-guard, F, substantially as specified.

32. The combination, with a pair of rotary disks or die-carriers, B C, each provided with a series of clamping-dies, of projecting ledges on the disk B, for carrying the blank forward, and a spring or yielding blank-guard, F, substantially as specified.

33. The combination, with a pair of rotary disks or die-carriers, B C, each provided with a series of clamping dies, of projecting ledges on the disk B, for carrying the blank forward, a blank-guard, F, and a drag-spring, L, substantially as specified.

34. The combination, with a pair of rotary disks or die-carriers, B C, each provided with a series of clamping-dies, of projecting ledges on the disk B, for carrying the blank forward, and a blank-guard, F, said disk C and the dies thereon having a peripheral groove to receive the end of said blank-guard F, substantially as specified.

35. The pointing-dies E E, having V-shaped cutting-edges $e^2 e^2$, and cheeks or meeting faces $e^4 e^4$ outside, slightly higher than said cutting-edges, substantially as specified.

36. The rotary pointing-dies E E, having their peripheral meeting faces or cheeks ground on a larger circle than the path of their cutting-edges, substantially as specified.

37. The combination, with a pair of continuously-revolving rotary die-carriers and dies thereon, of a stop for the end of the wire and a rotary slip-feed for feeding the wire against the stop and across the path of the dies, substantially as specified.

38. The combination, with a pair of continuously-revolving rotary die-carriers and dies thereon, of a stop for the end of the wire, a rotary slip-feed for feeding the wire against the stop and across the path of the dies, and a rotary cutter, substantially as specified.

39. The combination of a pair of continuously-revolving rotary die-carriers and dies thereon, of a stop for the end of the wire, a rotary slip-feed for feeding the wire against the stop and across the path of the dies, a rotary cutter, and a curved guard for the severed blank, substantially as specified.

40. The combination, with a pair of rotary disks, B C, and clamping-dies thereon, of a transversely-revolving rotary heading-tool, and a bearing-roll to resist the thrust of the heading-tool, substantially as specified.

41. The combination, with a pair of continuously-revolving rotary die-carriers and dies thereon, of a stop for the end of the wire and a rotary slip-feed for feeding the wire against the stop and across the path of the dies, a rotary cutter, a curved guard for the severed blank, a transversely-revolving rotary heading-tool, and a double-coned bearing-roll, R, bearing against beveled edges on the disks opposite the point of thrust, substantially as specified.

42. The combination, with a pair of rotary disks, B C, and clamping-dies thereon, of a transversely-revolving rotary heading-tool and a doubled-cone bearing-roll, R, bearing against beveled edges on the disks opposite the point of thrust, substantially as specified.

43. The rotary disks B C, having annular channels $b c$, rims $b' c'$, and radial slots $b^2 c^2$ therein, clamping-dies D D, pointing-dies E E, and radial adjusting devices, substantially as specified.

44. The combination, with rotary disks B C and clamping-dies D D thereon, of a radially-adjustable transversely-revolving rotary heading-tool, substantially as specified.

45. The combination, with rotary disks B C and clamping-dies D D thereon, of a radially-adjustable transversely-revolving rotary heading-tool and vertically and transverse adjustable bearing for the shaft of said heading-tool, substantially as specified.

46. The combination, with the shafts $C'$ and a wheel or gear thereon, of the inclined keys $o^9 o^{10}$, substantially as specified.

47. The combination, with the shafts $B' C'$ and intermeshing gears thereon, of the inclined adjusting-keys $o^9 o^{10}$, substantially as specified.

48. The combination, with the rotary die-carrier disks B C and their shafts $B' C'$, of gear $o^4$, and a split gear $o^5 o^6$, one part of which is adjustable upon the other for taking up wear between the teeth of said gears, substantially as specified.

49. The combination, with rotary die-carrier disks B C and clamping-dies thereon, of a rotary heading-tool, N, interposed swaging-blocks $N^3$, and a cam, $N^5$, for returning said swaging-blocks to position, substantially as specified.

50. The combination, with rotary die-carrier disks B C and clamping-dies thereon, of a rotary heading-tool, N, interposed swaging-blocks $N^3$, and a cam, $N^5$, for returning said swaging-blocks to position, and a guard, $N^6$, substantially as specified.

CHRISTIAN C. HILL.

Witnesses:
EDMUND ADCOCK,
H. M. MUNDAY.